April 28, 1942.  W. E. GARITY  2,281,033
METHOD OF PRODUCING ANIMATED PHOTOPLAYS
Filed May 8, 1939
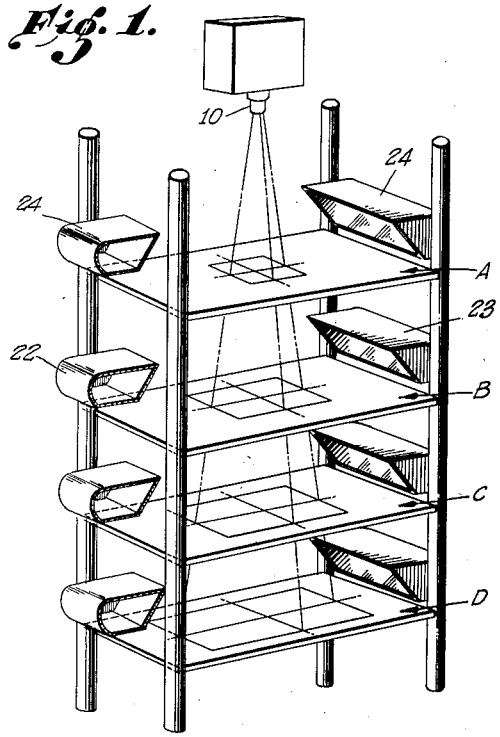
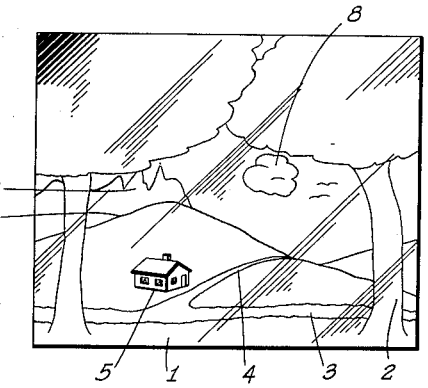
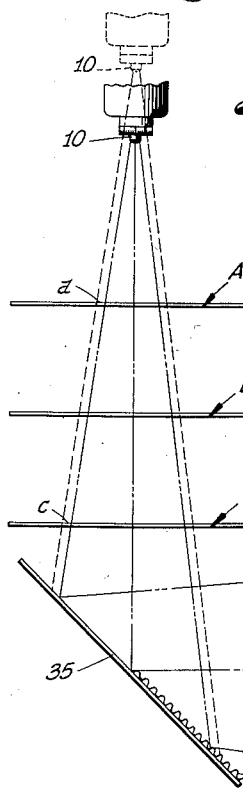
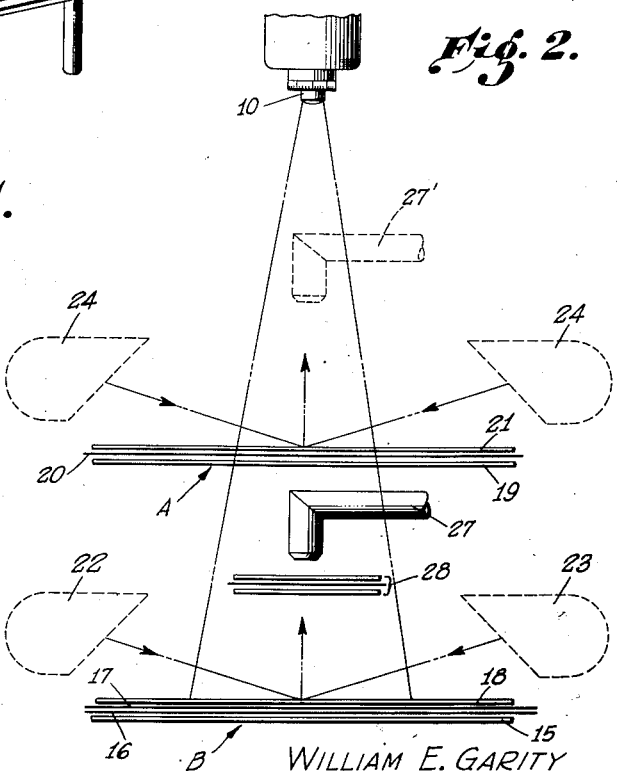
WILLIAM E. GARITY
INVENTOR.
BY
ATTORNEY.

Patented Apr. 28, 1942

2,281,033

UNITED STATES PATENT OFFICE 2,281,033

METHOD OF PRODUCING ANIMATED PHOTOPLAYS

William E. Garity, Los Angeles, Calif., assignor to Walt Disney Productions, Los Angeles, Calif., a corporation of California Application May 8, 1939, Serial No. 272,315

3 Claims. (Cl. 88—16)

The present invention pertains to methods of producing photoplays in which pictorial representations are employed, the resulting photoplays being generally referred to as animated cartoons. The invention is particularly directed to methods of creating an illusion of depth which is ordinarily not obtained by methods previously employed.

Heretofore animated cartoon photoplays have been made by drawing characters, objects, backgrounds and other elements of a completed scene upon transparent carriers such as, for example, Celluloid, glass, or the like. The background was usually painted or drawn upon substantially opaque paper or, in the event it was painted upon a transparent carrier, such carrier was painted or covered with an opaque or translucent paint, pigment, or the like. Animation of the finished photoplay was accomplished by changing certain of the cells, each cell representing a slightly different position of a character or object. Ordinarily, the various transparencies or cells were laid upon one another, contact between the cells being insured by the use of a transparent platen or presser plate, the entire assemblage being photographed by a stop motion camera.

These prior methods had certain disadvantages. The drawing or painting positioned closest to the lens of the camera received most of the illumination and since all of the cells or drawings lay in substantially a single plane, each element carried by the cells was within the focal plane of the camera and created the appearance of a cut-out with extremely sharp outlines, in the finished photographic image. As a result, the photographic images had the effect of flat drawings and no illusion of depth was produced. The foreground object or character appeared to float and was not properly correlated to the remaining elements of the drawings. It was found that artists could not successfully depict distance in their drawings since the slightly diffused effect which most readily indicates distance could not be duplicated by the artists.

Moreover, prior methods of procedure made it extremely difficult to depict a character moving in a front to back direction since in order to produce this effect (as in a trucking shot where the camera follows a character running toward the background) it was necessary for the artists to draw a large series of backgrounds, each background drawing depicting a step forward so as to create the effect of change in distance between the character and the background.

The present invention is directed toward methods of producing animated cartoon photoplays in a ready and facile manner and without the necessity of the laborious and unsatisfactory expedients which characterize the attempts of the prior art. It has been found that a remarkable effect of depth or third dimension can be obtained by depicting various planes at different distances between the camera and a background and by placing those transparencies, drawings or paintings which depict objects or characters in spaced planes between the camera and the background, such spaced planes corresponding approximately to the positions which would be assumed by such characters in the completed or composite scene. For example, foreground objects are depicted on transparencies which are then positioned in a plane closest to the camera. Middle distance objects or characters are depicted on transparencies which are positioned between such foreground plane and the background plane whereas the background plane occupies a position furthest removed from the camera.

The invention is further directed toward a method of positioning the various pictorial representations in spaced planes, the planes being spaced with respect to the focal plane of the camera lens so that a desired character or group of characters may appear to be in focus whereas more distant elements of the final scene or those immediately in front of the observer can be slightly out of focus and thereby create the diffused effect which characterizes depth of vision.

A still further concept embraced by this invention provides methods of controlling or balancing the illumination upon the various complementary pictorial representations of a single scene so that the undesired cut-out or silhouette effect of a given object or character is minimized and instead the film in the camera is more equally sensitive to the various planes or objects depicted upon the pictorial representations.

An object of the present invention, therefore, is to provide a method of producing animated cartoon photoplays in which an illusion of depth can be readily attained.

Another object is to provide methods whereby the illumination imposed upon various cells or elements entering into a completed scene may be balanced and controlled.

A further object is to disclose and provide methods of photography whereby effects of depth or distance may be attained readily.

These and other objects, uses, adaptations and advantages of this invention will become apparent to those skilled in the art from the following detailed description of certain illustrative embodiments of this invention.

In order to facilitate description, reference will be had to the appended drawing, in which:

Fig. 1 diagrammatically illustrates a method of positioning and illuminating transparencies for use in the production of animated photoplays.

Fig. 2 is a paraxial section taken through the arrangement illustrated in Fig. 1 and diagrammatically illustrating the method of balancing illumination.

Fig. 3 is a composite image which may be obtained by the use of the methods herein disclosed.

Fig. 4 is a diagrammatic side elevation of a modified arrangement of elements used in carrying out the invention.

The method of this invention utilizes pictorial representations carried by transparent media such as Celluloid, glass, or the like. Three or more separate cells may be used in producing the completed image or pictorial representation. Each of the cells may bear one or more component elements of the final scene. For purposes of illustration, attention is called to Fig. 3 of the appended drawing. As there shown, the completed scene may include immediate foreground consisting of a strip of grass, indicated at 1, trees 2 and a roadway 3. The middle distance may include the branch road 4 and a house 5 upon a hill 6. The background may comprise the mountains 7 and the clouds 8. Action or various characters may appear either on the road 3 in the foreground or upon the road 4 in the middle distance, or on both.

In accordance with this invention, elements and characters appearing in the foreground including the grass strip 1 and the road 3 will be painted upon cells positioned in a forward plane. All action or characters appearing on the road 4 or action occurring in the vicinity of the house 5 will be painted upon cells which are then mounted in another plane spaced from the plane occupied by the cells depicting the foreground action. The background elements such as the mountains 7, clouds 8, sky, etc., may be painted upon carriers positioned in a plane spaced from the middle distance plane.

By referring to Fig. 1, the three spaced planes into which the completed scene may be divided, are indicated at A, B and C. It is to be noted that these three planes are parallel and are within the field of view of the camera lens, indicated at 10. The cells, drawings or other pictorial representations which are positioned in plane B, are drawn on a larger scale than would be the case if such cells or drawings were to be placed immediately behind and in contact with the pictorial representations positioned in plane A. The field of view in plane B is larger than the field of view in plane A due to the angle of vision of the camera lens 10.

In order to properly position and hold the various cells or pictorial representations, an apparatus of the character shown in Patent No. 2,198,006 is preferably employed and reference is hereby made to such patent for details of construction of a suitable apparatus. Generally stated, this apparatus comprises a plurality of movable planes or frames capable of being moved toward and away from the camera lens and also provided with means whereby the cells on each of said planes may be moved transversely or in a horizontal direction and also in a lateral direction within each plane. In the aforesaid patent means are also disclosed for illuminating the camera side of each of the planes.

As shown in Fig. 2, the plane B may include a glass or transparent support 15 carrying cells 16 and 17, these cells being maintained in position by means of a transparent platen or presser plate 18. The cell A, on the other hand, may comprise a transparent support 19 and the cell 20, this cell being maintained in contact and in flat position by means of a transparent platen 21. Light from the sources 22, 23, is caused to illuminate the camera side of the cells 16 and 17 whereas light from the sources 24 is caused to illuminate the camera side of the cell 20. In most instances, no light is permitted to pass directly from the sources 22 and 23 upon the rear side of the cell 20 of plane A.

It is to be noted that since the camera lens 10 receives only light reflected from the various cells, in the event light sources 22, 23 and 24 are of uniform intensity, the camera lens (or the film upon which such lens is focused) will receive more light from the cell 20 than from the cell 16. This would be due to the fact that the light received by the cell 16 from the sources 22 and 23 would in part be lost by passage through cell 17, platen 18, support 19, cell 20 and platen 21, before it reached the camera lens. Light from the sources 24, however, will be reflected by the cell 20 and the only loss which takes place would be that occasioned by the presser plate 21.

In accordance with this invention, therefore, the illumination supplied to the various planes A, B, and C is varied so as to produce substantially equal intensities of reflected light reaching the camera from each of said representations. Differently expressed, the present invention contemplates illuminating the rear representation or the representations in plane B with light of sufficiently higher intensity than the illumination of plane A so as to compensate for absorption losses of light passing through the plane A. Similar considerations apply to the illumination of plane C. Since most of the representations are painted in colors and photographed for reproduction in color, the mode of illumination here described is important because of the rigid requirements of color film and the narrow range of conditions under which such film may be successfully used.

In properly balancing and distributing the illumination, consideration is given to the effect which it is desired to produce. If, for example, the primary center of interest and the most pertinent action of the photoplay is to take place on the branch road 4 or immediately in front of the house 5 (Fig. 3) and the cells or pictorial representations reproducing such action are positioned in plane B, then plane B is given the maximum illumination which the sources 22 and 23 can supply. The intensity of the light reflected from the cells 16 and 17 of plane B is then measured by introducing a suitable photometric device, such as the one diagrammatically indicated at 27, into the space separating planes A and B. During measurement of such reflected light, a filter, generally indicated at 28, is positioned between the photometric device 27 and the plane B, this filter consisting of the same number of pieces of glass and cells as comprise the arrangement of plane A. In other words, if plane A consists of a supporting glass and cover glass and two cells, then the filter 28 consists of two pieces of glass and two cells. In effect, therefore, the element 27 will now measure the intensity of light as received by the camera lens 10 without permitting the light to pass through the pictorial representations carried in plane A.

After a reading taken in this manner has been recorded, the photometric device is placed in the position indicated at 27', i. e., between plane A and the camera, all filters being removed. The sources of illumination 24 are now adjusted so as to cause the photometric device 27 to show an intensity of light reflected from the cells of plane A which is substantially equal to the reading previously obtained on the cells of plane B.

In the event other planes were to be positioned, at spaced intervals, between the primary action plane and the camera, similar methods of balancing the light supplied to such planes would be employed.

The light supplied to the background plane C is preferably of lower intensity or lower intensity effect. For example, if the light sources 22 and 23 of the main action plane B were adjusted to a maximum in taking the original reading, then the light sources supplying light to the background plane C could also be turned up to a maximum emission but the reflected light, reaching the camera lens, would not be as intense as that reflected from plane B because of the intervening layers of glass and cells which comprise plane B. When the light supplied to the various planes is balanced in the manner stated, the foreground objects, such as those depicted on cell 20, will not stand out with unnecessary brilliance in the finished photographed composite image but instead will appear to be balanced with the light intensity of the middle ground objects, thereby creating a much more pleasing and realistic effect.

In some instances it is desired to soften the representation of the background carried by plane C so as to give an added effect of distance or to soften the photographed image in so far as it pertains to objects in the immediate foreground, such as, for example, the trees 2 and the strip of grass 1, so as to give the impression that these trees are so close to the observer that they are slightly diffused. These effects may be readily attained in accordance with this invention by adjusting the iris or diaphragm of the camera so as to produce a definite focal plane effect and by placing that plane which bears the important action (on which interest is centered) within the focal plane of the camera lens while the other planes, such as planes A and C, are placed slightly outside the focal plane of the camera lens. It has been found, for example, that those objects upon which attention is to be centered should be placed at a distance from the camera lens wherein the circle of confusion does not exceed 0.003 inch, this permitting the camera lens and the photographic emulsion associated therewith to depict clear-cut images. Background elements (carried by the plane C, for example) are then placed at a distance from the lens wherein the circle of confusion ranges from about 0.003 to 0.006 inch. The photographic image of objects or cells placed at such distance will be very slightly diffused, creating an effect of depth or distance which can not be attained in any other manner. It has been found that artists have great difficulty in painting pictorial representations and creating an effect of haze or distance although they can very readily paint such backgrounds in their customary manner in which the outlines of the mountains, clouds, etc., are fairly sharp. The method of this invention permits the artists to work in their usual manner, the brilliance of outline being then softened during photography by proper positioning of the background cells or planes with respect to the principal focal plane of the camera lens being employed. If the circle of confusion materially exceeds 0.006 inch, then the image becomes too diffused and too indistinct for ordinary work, although in some instances extreme placing of the images may be used, as, for example, in the creation of heavy fog effects or the like.

The immediate foreground plane A can similarly be moved toward the camera to a point where the circle of confusion becomes sufficient to create a diffused effect, indicative of very close proximity of such foreground objects to the observer.

By reason of the arrangement shown, wherein the cells are mounted on planes spaced from each other and capable of movement toward or away from the camera, numerous effects may be obtained. Trucking shots can be attained, for example, by moving the camera down toward the plane on which the most interesting action is located as, for example, on plane B, while simultaneously moving the background plane C in the same direction, i. e., away from plane B. In this manner the completed photographic film which, as shown in Fig. 3 indicates the house 5 to be in the middle distance, can be caused to create the impression of moving closer and closer to the house 5 until such house is in the foreground of the completed picture. As the immediate plane A comes closer to the camera, it will become more and more diffused until finally such immediate plane A can be completely removed. The background plane C should be maintained at a substantially constant distance from the camera lens, however, in most cases, since ordinarily clouds do not get larger just because you travel towards them. Certain elements of the background could be placed in a plane between plane B and plane C, however.

The spaced arrangement of the various planes enhances the apparent depth of the complete recorded images, when such images are produced by movement of the camera toward or away from the planes, by reason of the fact that the increment of total plane area lost by movement of the camera downwardly is much greater on an upper plane than on a lower plane so that the apparent transverse or outward movement of objects disappearing from the foreground is greater than similar movement of objects in the background. By referring to Fig. 4, it will be seen that when the camera is moved from the position indicated in dotted lines to the lower position, the loss in field of view on plane A is indicated as $a$ while the loss on plane C is equal to $c$. The ratio of $a$ to the total field on plane A is much greater than that of $c$ to the total field on plane C. Each of the planes may be provided with means whereby the pictorial representations carried thereby can be shifted to the North, South, East or West as desired, and to a predetermined amount. This is very useful in making photoplays in which a character or characters appear to be moving in a plane parallel to the observer, since the background and immediate foreground planes can then be moved to give the desired illusion. Movement of planes A, C and D (when the character is depicted on plane B) is not the same; differential movements need be employed to give truer finished images. Plane D may be moved less than a tenth of an inch to the right, while plane C may be moved two or three tenths of an inch in the same direction. Plane A may be moved even greater increments (between periods of photography) so as to create an illusion of speed, and proper perspective. The distances given are illustrative of the general procedure and not limiting in any manner.

Whenever reference has been made herein to planes positioned in the field of view of a camera or transverse to the optical axis of the camera lens, reference is made to planes which not only intersect a direct extension of the optical axis but also to planes which would intersect a projected optical axis as, for example, when the optical axis is deflected by means of reflectors or the like. In some instances it is desirable to employ mirrors for the purpose of reflecting an image into the camera. One form of such arrangement is shown in Fig. 4 and it will be noted that planes A, B and C are parallel to one another and are transverse to the optical axis of the camera lens 10. The final background, however, is mounted upon the plane E which is at right angles to the planes A, B and C. A mirror 35 is positioned in such way as to reflect the image from the plane E into the camera lens 10. Such mirror may cover the entire field of view of the camera lens or but a part of the field and the arrangement shown in Fig. 4 is of value when it is desired to produce reflections or to simulate reflections. For example, if it is desired to pictorialy depict a reflection distorted by wave action or water, then the crinkled transparent or semi-transparent substance indicated generally at 36 may be placed upon the desired areas of the mirror 35, such crinkled surfaces then properly distorting or refracting the images reflected from plane E by the mirror 35 into the camera lens 10 and creating a very realistic effect of water reflections.

Nor is it necessary that the pictorial representations carried by all of the planes be perpendicular to the optical axis or its extension. In some instances it is highly desirable to place a background element or representation at an angle to the optical axis, as for example where action is taking place on a football field, whereupon a representation of a gridiron may be placed at an angle to the camera axis, the yard lines then assuming a desired perspective. When such inclined planes are employed, the importance of the method of illumination previously disclosed herein is most emphatically demonstrated.

Those skilled in the art will readily adapt the methods hereinabove described to various effects which may be needed in order to create a desired pictorial composition.

I claim:

1. In a method of producing an effect of depth in photographic images of pictorial representations, the steps of: placing pictorial representations in two parallel spaced planes along the optical axis of a camera lens, said pictorial representations being complementary, the representation closer to said camera lens being carried by a transparent member, illuminating the camera side of each of said representations, illuminating the rear representation with light of sufficiently higher intensity than the illumination of the front representation to compensate for absorption losses of light passing through the front representation and its carrying medium, and moving the camera lens and the rear representation along the camera lens axis and in the same direction, between periods of photography by said camera.

2. In a method of producing an effect of depth in photographic images of pictorial representations, the steps of: placing pictorial representations of foreground objects in a plane transverse to the optical axis of a camera and at a distance from the camera lens wherein the circle of confusion does not exceed 0.003 inch, placing pictorial representations of distant objects outside the principal focal range of the camera lens and at a distance therefrom wherein the circle of confusion ranges from about 0.003 inch to 0.006 inch, illuminating the camera side of each of said pictorial representations, photographing the images thus illuminated and placed, and moving the camera and a background representation along the camera lens axis and in the same direction between successive photographic exposures by said camera while maintaining foreground representations in substantially the same plane.

3. In a method of producing an effect of depth in animated motion pictures of pictorial representations, the steps of: placing several pictorial representations in spaced planes transverse to the optical axis of a camera and at different distances therefrom, said representations being relatively opaque and carried by virtually transparent members; placing a background representation in a plane spaced from said spaced pictorial representations; all of said representations being complementary; separately illuminating the camera side of each of said representations; separately adjusting the intensity of illumination on each of said representations from front to back to increase the illumination with the number of intervening representations between the camera and the representation illuminated; and moving the camera and the background representation along the camera axis and in the same direction between successive exposures by said camera, while maintaining a part at least of said intervening representations in substantially stationary planes.

WILLIAM E. GARITY.